United States Patent
Abutbul et al.

(10) Patent No.: US 11,663,057 B2
(45) Date of Patent: *May 30, 2023

(54) ANALYTICS FRAMEWORK FOR SELECTION AND EXECUTION OF ANALYTICS IN A DISTRIBUTED ENVIRONMENT

(71) Applicant: International Business Machines Corporation, Armonk, NY (US)

(72) Inventors: Amram Abutbul, Haifa (IL); Yu Cao, Santa Clara, CA (US); Simona Cohen, Haifa (IL); Ahmed El Harouni, San Jose, CA (US); Deepika Kakrania, San Jose, CA (US); Tanveer F. Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/458,709

(22) Filed: Aug. 27, 2021

(65) Prior Publication Data
US 2021/0390435 A1  Dec. 16, 2021

Related U.S. Application Data

(63) Continuation of application No. 15/852,484, filed on Dec. 22, 2017, now Pat. No. 11,151,465.

(51) Int. Cl.
*G06F 9/54* (2006.01)

(52) U.S. Cl.
CPC ................... *G06F 9/54* (2013.01)

(58) Field of Classification Search
CPC ..... G06F 9/54; G06F 8/60; G06F 8/76; G05B 2219/31324
See application file for complete search history.

(56) References Cited

U.S. PATENT DOCUMENTS

| | | |
|---|---|---|
| 7,644,052 B1 | 1/2010 | Chang et al. |
| 9,880,823 B1 | 1/2018 | Barnea et al. |

(Continued)

OTHER PUBLICATIONS

Progress.com, "Using Databases Indexes", Progress.com, Retrieved via Inter Archive on Jul. 5, 2017 from https://web.archive.org/web/20170105004618/https://www.progress.com/tutorials/odbc/using-indexes Jul. 2017, 9 pages.

(Continued)

*Primary Examiner* — Dong U Kim
(74) *Attorney, Agent, or Firm* — Stephen J. Walder, Jr.; James Olsen

(57) ABSTRACT

Mechanisms are provided to implement a multi-layer analytics framework. The multi-layer analytics framework obtains a plurality of analytics from one or more analytics source computing systems, at least two analytics being written in different computer programming languages. The multi-layer analytics framework applies a wrapper to each of the analytics in the plurality of analytics to thereby generate wrapped analytics. The wrapper provides a unified interface for executing the analytics in the plurality of analytics regardless of the particular computer programming language used to create the analytics. The multi-layer analytics framework registers the wrapped analytics in an analytics registry, and executes an analytics pipeline comprising wrapped analytics in the analytics registry to perform an analytics operation based on the unified interface of the wrappers of the wrapped analytics.

20 Claims, 7 Drawing Sheets

(56) References Cited

U.S. PATENT DOCUMENTS

| | | |
|---|---|---|
| 9,984,772 B2 | 5/2018 | Liu et al. |
| 9,990,187 B1* | 6/2018 | Carroll .................. G06F 8/71 |
| 10,386,827 B2* | 8/2019 | Enver ............... G05B 19/0428 |
| 10,387,454 B2 | 8/2019 | Gilboa-Solomon et al. |
| 10,417,528 B2 | 9/2019 | Ma et al. |
| 2006/0029184 A1* | 2/2006 | Lin .................... G01N 23/207 378/73 |
| 2011/0125734 A1 | 5/2011 | Duboue et al. |
| 2013/0198163 A1 | 8/2013 | Slezak et al. |
| 2015/0006456 A1 | 1/2015 | Sudharsan |
| 2015/0095917 A1 | 4/2015 | Challenger et al. |
| 2016/0078181 A1* | 3/2016 | Tanner, Jr. ............. G16H 40/20 705/2 |
| 2016/0098037 A1* | 4/2016 | Zornio ............... H04L 41/0803 700/20 |
| 2017/0052652 A1 | 2/2017 | Denton et al. |
| 2017/0102678 A1* | 4/2017 | Nixon .................... G05B 17/02 |
| 2017/0111331 A1 | 4/2017 | Auradkar et al. |
| 2017/0255373 A1* | 9/2017 | Bruno ................. G06F 11/3058 |
| 2017/0293725 A1 | 10/2017 | Liu et al. |
| 2017/0357648 A1* | 12/2017 | Fink .................... G06F 16/2379 |
| 2018/0349814 A1 | 12/2018 | Dhingra et al. |
| 2019/0042286 A1* | 2/2019 | Bailey .................. G06F 9/5077 |
| 2019/0114168 A1* | 4/2019 | Lee ........................ G06F 8/60 |
| 2019/0138912 A1 | 5/2019 | Modarresi et al. |
| 2019/0171425 A1 | 6/2019 | Dempsey |
| 2019/0190921 A1 | 6/2019 | Rieser et al. |
| 2019/0197418 A1 | 6/2019 | Abutbul et al. |
| 2019/0197419 A1 | 6/2019 | Abutbul et al. |

OTHER PUBLICATIONS

List of IBM Patents or Patent Applications Treated as Related, Aug. 27, 2021, 2 pages.

High, Rob, "The Era of Cognitive Systems: An Inside Look at IBM Watson and How it Works", IBM Corporation, Redbooks, Dec. 12, 2012, 16 pages.

Malensek, Matthew et al., "Using Distributed Analytics to Enable Real-Time Exploration of Discrete Event Simulations", 2014 IEEE/ACM 7th International Conference on Utility and Cloud Computing, pp. 49-58, Jun. 2014, 10 pages.

Toub, Stephen, ".Net Matters—Parallelizing Operations with Dependencies", Taken from https://docs.microsoft.com/en-us/archive/msdn-magazine/2009/april/parallelizing-operations-with-dependencies, pp. 1-10, Apr. 2009.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

* cited by examiner

ANALYTICS FRAMEWORK FOR SELECTION AND EXECUTION OF ANALYTICS IN A DISTRIBUTED ENVIRONMENT

BACKGROUND

The present application relates generally to an improved data processing apparatus and method and more specifically to mechanisms for providing an analytics framework for selection and execution of analytics in a distributed environment.

Decision-support systems exist in many different industries where human experts require assistance in retrieving and analyzing information. An example that will be used throughout this application is a diagnosis system employed in the healthcare industry. Diagnosis systems can be classified into systems that use structured knowledge, systems that use unstructured knowledge, and systems that use clinical decision formulas, rules, trees, or algorithms. The earliest diagnosis systems used structured knowledge or classical, manually constructed knowledge bases. The Internist-I system developed in the 1970s uses disease-finding relations and disease-disease relations. The MYCIN system for diagnosing infectious diseases, also developed in the 1970s, uses structured knowledge in the form of production rules, stating that if certain facts are true, then one can conclude certain other facts with a given certainty factor. DXplain, developed starting in the 1980s, uses structured knowledge similar to that of Internist-I, but adds a hierarchical lexicon of findings.

Iliad, developed starting in the 1990s, adds more sophisticated probabilistic reasoning where each disease has an associated a priori probability of the disease (in the population for which Iliad was designed), and a list of findings along with the fraction of patients with the disease who have the finding (sensitivity), and the fraction of patients without the disease who have the finding (1-specificity).

In 2000, diagnosis systems using unstructured knowledge started to appear. These systems use some structuring of knowledge such as, for example, entities such as findings and disorders being tagged in documents to facilitate retrieval. ISABEL, for example, uses Autonomy information retrieval software and a database of medical textbooks to retrieve appropriate diagnoses given input findings. Autonomy Auminence uses the Autonomy technology to retrieve diagnoses given findings and organizes the diagnoses by body system. First CONSULT allows one to search a large collection of medical books, journals, and guidelines by chief complaints and age group to arrive at possible diagnoses. PEPID DDX is a diagnosis generator based on PEPID's independent clinical content.

Clinical decision rules have been developed for a number of medical disorders, and computer systems have been developed to help practitioners and patients apply these rules. The Acute Cardiac Ischemia Time-Insensitive Predictive Instrument (ACI-TIPI) takes clinical and ECG features as input and produces probability of acute cardiac ischemia as output to assist with triage of patients with chest pain or other symptoms suggestive of acute cardiac ischemia. ACI-TIPI is incorporated into many commercial heart monitors/defibrillators. The CaseWalker system uses a four-item questionnaire to diagnose major depressive disorder. The PKC Advisor provides guidance on 98 patient problems such as abdominal pain and vomiting.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to implement a multi-layer analytics framework. The method comprises obtaining, by the multi-layer analytics framework, a plurality of analytics from one or more analytics source computing systems. The plurality of analytics comprise at least two analytics written in different computer programming languages. The method further comprises applying, by the multi-layer analytics framework, a wrapper to each of the analytics in the plurality of analytics to thereby generate wrapped analytics. The wrapper provides a unified interface for executing the analytics in the plurality of analytics regardless of the particular computer programming language used to create the analytics. Moreover, the method comprises registering, by the multi-layer analytics framework, the wrapped analytics in an analytics registry, and executing, by the multi-layer analytics framework, an analytics pipeline comprising wrapped analytics in the analytics registry to perform an analytics operation based on the unified interface of the wrappers of the wrapped analytics.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
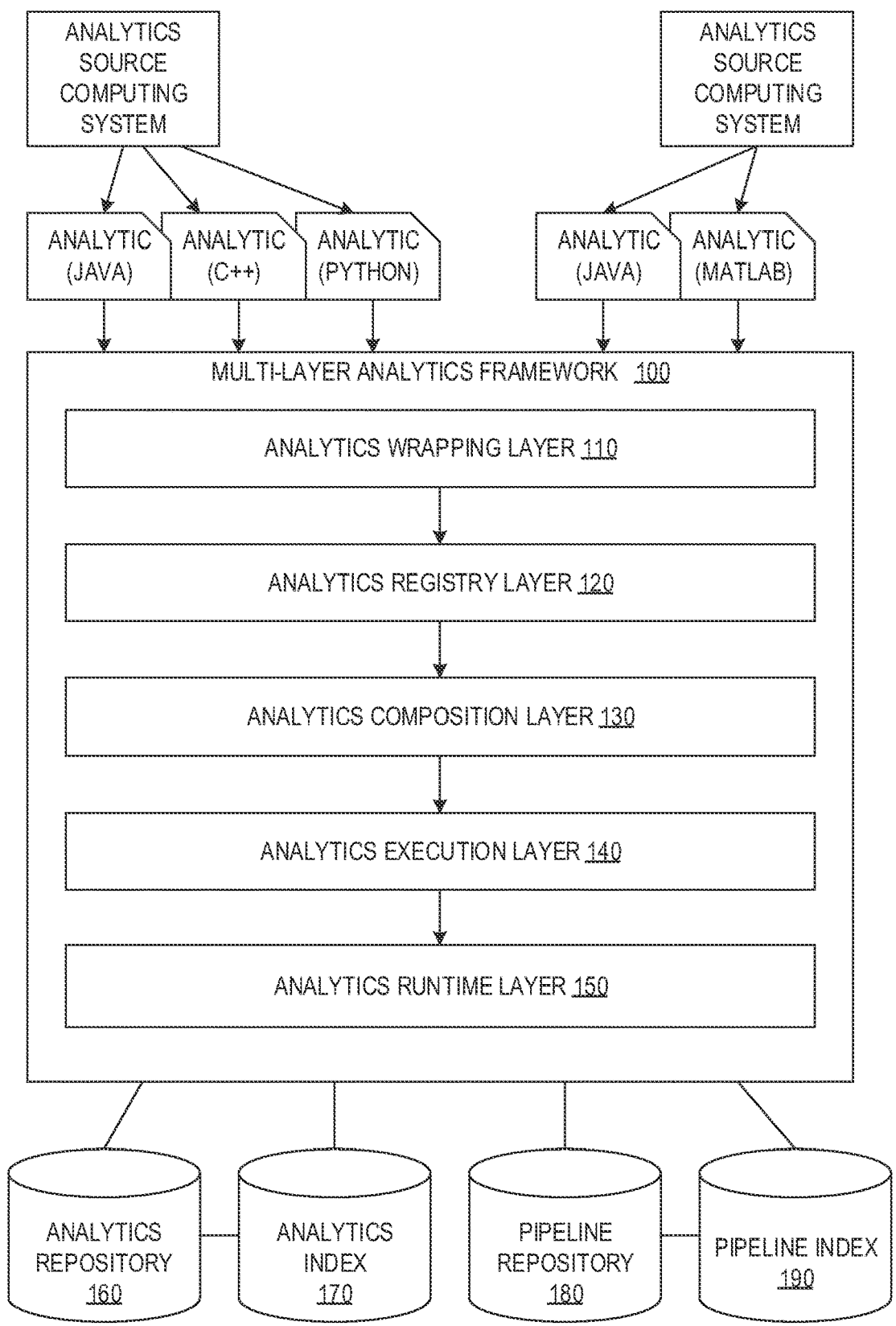
FIG. 1 is an example diagram illustrating a multiple-layer analytics framework for registering, composing, and executing analytics in accordance with one illustrative embodiment.

The illustrative embodiments provide mechanisms for registration, composition, and execution of analytics in a distributed environment. Moreover, the mechanisms of the illustrative embodiments provide an analytics description and composition framework that facilitates the selection and execution of analytics in the distributed environment. Many decision support computing systems, cognitive computing systems, and the like, make use of a variety of analytics. Analytics, as a practice, is the use of computer algorithms to discover, interpret, and communicate meaningful patterns in data. Especially valuable in areas rich with recorded information, analytics relies on the simultaneous application of statistics, computer programming and operations research to quantify performance. Areas within analytics include predictive analytics, prescriptive analytics, enterprise decision management, descriptive analytics, cognitive analytics, marketing optimization analytics, web analytics, call analytics, speech analytics, predictive science analytics, risk analysis analytics, and fraud analytics, to name only some. The computer algorithms executed by computing devices to perform analytics operations are referred to in general as "analytics" herein.

As analytics are utilized in a variety of different computing systems to provide mechanisms for extracting and understanding meaningful patterns in data, it can be appreciated that various analytics mechanisms are implemented in different programming languages and operate on different computing systems. As a result, often there is difficulty in making analytics of one system compatible with other analytics, or with analytics on another system. This leads to difficulty in configuring computing systems to operate on multiple analytics offered by multiple different providers, often involving multiple different computer programming languages that are not readily compatible, and using different systems that may not be configured to operate with one another.

Thus, it would be beneficial to have a framework by which analytics may be registered, composed into pipelines of execution in which the analytics are able to operate in conjunction with one another, and execute those analytics regardless of the particular programming languages utilized or the particular computing systems for which they are designed. Such a mechanism will ensure compatibility of analytics and allows for cross-platform reuse of analytics without having to recreate the analytics in the particular computer programming language utilized by an execution platform.

The illustrative embodiments provide a unified framework for performing registration, composition, and execution of analytics in a variety of different programming languages and across multiple different data processing systems. The illustrative embodiments facilitate the distributed execution of the composition of the analytics as pipelines. This result is achieved by providing a multi-layer analytics framework in which analytics of various programming languages, e.g., C++, Matlab, Java, Python, or the like, are wrapped in a wrapper and registered with an analytics index and analytics repository. The illustrative embodiments provide mechanisms for determining what analytics are needed for performing a desired decision support operation, searching the analytics index and repository for corresponding analytics, and composing those analytics found into a pipeline which may be represented as a workflow directed acyclic graph (DAG). The DAG specifies what analytics may be performed in parallel and what analytics need to be executed serially. Portions of the DAG may be dynamically distributed to various data processing systems to perform the analytics associated with the portion of the DAG assigned to them.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for registering analytics from a variety of different sources and/or in a variety of different programming languages, and composing these analytics into pipelines representing workflows that may be distributed to various data processing systems or computing devices to perform the corresponding analytics of the portions of the pipelines assigned to them. The distributed pipeline may be executed on the various data processing systems or computing devices, using the wrapper mechanism to provide a unified interface for executing various types of analytics provided in different computer programming languages, and corresponding interpretation engines of the various data processing systems or computing devices. A wrapper is a subroutine in a software library or a computer program whose main purpose is to call a second subroutine or a system call with little or no additional computation. With the illustrative embodiments, a wrapper can be written for each third party analytic and used in the native application of the data processing system to translate an existing interface into a compatible interface. Wrappers are generally known in the art, although wrappers have not been applied to analytics in the manner set forth in the present illustrative embodiments.

The wrappers of the illustrative embodiments provide for multi-modal analytics enabling pipelines that combine textual analytics, imaging analytics of various modalities, reasoning analytics, etc. To simplify wrapper development, each wrapper may be written in the same programming language as the analytics it wraps, and may be generated automatically. The wrappers support large files and models as are required by the imaging analytics. The wrappers utilize the domain standardized models to combine the various analytics to a unified result, e.g., for healthcare, the HL7 FHIR standardized models may be utilized. The results of the various analytics may be combined in an append mode to ease the parallelization of the analytics execution.

The following description will assume an implementation of the illustrative embodiments for medical imaging analytics, however the present invention is not limited to such. Rather, the illustrative embodiments may be utilized in any data processing system in which analytics from a variety of different sources, in a variety of different programming languages, are to be combined into a pipeline for execution in stand alone or distributed data processing environment. It should be appreciated, however, that medical imaging embodiments have challenges addressed by the mechanisms of the illustrative embodiments, which may also be applicable to other domains. For example, in medical imaging, the technological solution provided by the illustrative embodiments is designed to support very large files and models, e.g., millions or even billions of these files which are accessed by reference. The technological solution offered by the illustrative embodiments supports smart caching and intelligent parallelization of the analytics execution while keeping boundaries of atomic units. For example, some analytics may need to run on GPUs while others can run on CPUs and the illustrative embodiments support this heterogenous execution and sending the analytics to the appropriate computing elements.

With regard to the medical imaging analytics, it should be appreciated that such medical imaging analytics comprises operations in which medical imaging studies, each study comprising one or more medical images taken using one or more modalities and/or technologies, e.g., computed tomography (CT), magnetic resonance imaging (MRI), positron emission tomography (PET), ultrasound, x-ray, biomarkers, etc. Analytics may be used, for example, to detect salient image regions, anomaly detection, anatomical segmentation, anatomical structure measurements, color distinctiveness analysis, and the like.

FIG. 1 is an example diagram illustrating a multiple-layer analytics framework for registering, composing, and executing analytics in accordance with one illustrative embodiment. As shown in FIG. 1, the multiple-layer analytics framework 100 comprises an analytics wrapping layer 110, an analytics registry layer 120, an analytics composition layer 130, an analytics execution layer 140, and an analytics runtime layer 150. The various layers may be implemented as specialized computing software and/or hardware logic that is specifically configured to perform the operations attributed to these layers as described hereafter. In the case of software logic, the software logic is executed on computing hardware to cause the operations and specific functionality of the layer to be realized. Any combination of specialized software logic executing on computing hardware and specialized hardware logic executing within a data processing system may be utilized without departing from the spirit and scope of the present invention.

The analytics wrapping layer 110 provides logic for receiving analytics in a variety of different programming languages, e.g., C++, Matlab, Java, Python, or the like, potentially from a variety of different source systems, libraries, or the like, and applying corresponding wrappers to the analytics based on their characteristics to thereby generate a unified interface for executing the analytics in a distributed manner via the multi-layer analytics framework 100. In the wrapper, the input parameters and configuration for analytics are read in a unified form and the analytics results and explanation are written. The wrapper can be generated automatically in cases where this information can be deduced from other sources, such as documentation and registries. The wrappers implement domain standardized models, e.g., for healthcare the HL7 FHIR standardized model may be implemented or utilized.

The received analytics, wrapped in the corresponding wrapper to provide the unified interface, may be provided to the analytics registry layer 120 for registration of the wrapped analytic for use in generating workflows, or pipelines, for distribution to data processing systems or computing devices.

The analytics registry layer 120 registers the wrapped analytics with an analytics repository 160 which stores the wrapped analytics for later use in composing analytics pipelines and corresponding directed acyclic graphs (DAGs) representing the analytics pipelines. The analytics in the analytics repository 160 are further indexed by the analytics index data structure 170. The analytics index data structure 170 indexes the analytics according to various characteristics of the analytics including what inputs are received by the analytics and what outputs are generated by the analytics. For example, the index data structure 170 may be a copy of selected portions of characteristic data representing the analytics, which can be searched very efficiently, e.g., for imaging analytics characteristics such as how long the analytics executes on a CPU and how long it executes on a GPU, what resources and models are required and their sizes, minimum cache, minimum RAM, etc. may be included in the index data structure 170. Thus, when composing an analytics pipeline, the analytics index data structure 170 may be searched for analytics performing the operations, e.g., component analytics operations, required by the pipeline and the corresponding analytics may be retrieved from the analytics repository 160.

The analytics composition layer 130 responds to requests to perform an analytics based operation on an input set of data by automatically composing an analytics pipeline comprising a combination of a plurality of analytics from the analytics repository 160, which may be executed to generate a desired result corresponding to the requested analytics based operation. From the general request, the analytics composition layer 130 determines the analytics requirements for performing the requested operation, searches the analytics index for the corresponding analytics needed to perform the operation, composes the analytics into an analytics pipeline, and generates an implementation directed acyclic graph representing the analytics pipeline which is used to actually execute the analytics pipeline, potentially in a distributed manner by a plurality of distributed data processing systems or computing devices.

For example, in the context of medical imaging analytics, a request may be received to process a new medical imaging study to perform decision support operations for assisting a medical professional in diagnosing a patient, e.g., performing diagnosis of a patient's heart. The analytics composition layer 130 may automatically or semi-automatically generate a corresponding analytics pipeline for the requested operation being performed on the input data, e.g., medical imaging study. Analytics pipelines generated by the analytics composition layer 130 may be specific to the particular organ(s) for which the operation is to be performed, may be specific to the particular type of medical imaging study, the particular modality of the medical imaging being processed, and the like.

With an embodiment in which the analytics composition layer 130 provides mechanisms for semi-automatically generated analytics pipeline, the analytics composition layer 130 may provide a user interface through which a user may access information from the analytics repository 160 to compose, through a manual manipulation of the user interface, an analytics pipeline. The analytics composition layer 130 may provide, via the user interface, subsets of analytics from the analytics repository 160, that provide analytics that perform operations for achieving at least a portion of the functionality of the requested operation. These subsets may be identified by performing a search of the analytics index data structure 170 to identify such analytics and provide information about these analytics to the user via the user interface. These may be regarded as analytics recommendations provided to the user via the user interface and which may be selected by the user for inclusion in an analytics pipeline. In some illustrative embodiments, the user may drag-and-drop analytics objects representing these analytics on the user interface to generate a chain of the analytics to thereby represent a pipeline. The analytics composition layer 130 may then take the final analytics pipeline generated by the user, check the analytics pipeline for consistency, e.g., the input to an analytic is provided by a previous analytic or the like, and assuming the analytics pipeline passes all checks, generates a directed acyclic graph for the composed analytics pipeline. The directed acyclic graph generation may evaluate the analytics pipeline to identify which portions can be performed in parallel and which must be performed in sequence and, as a result, a tree-like graph representation is generated.

In an embodiment in which the analytics composition layer 130 provides an automated mechanism for generating analytics pipelines, logic is provided for searching the analytics index 170 to identify analytics in the analytics repository 160 that provide analytics for achieving the desired operation. This evaluation may make use of clinical knowledge represented in clinical rules, knowledge databases, etc., reasoning or cognitive engines, and the like, to determine, for the requested operation, which of the analytics are the ones that should be combined to generate an analytics pipeline. The logic may ensure that inputs to one analytic are provided either as input to the overall operation from an outside source, e.g., the input medical study, a patient electronic medical record (EMR), or the like, or from a previously executed analytic present in the analytic pipeline. The analytics composition layer 130 may continually check the analytics pipeline for consistency, e.g., the input to an analytic is provided by a previous analytic or the like, and generates a directed acyclic graph for the composed analytics pipeline. As noted above, the directed acyclic graph generation may evaluate the analytics pipeline to identify which portions can be performed in parallel and which must be performed in sequence and, as a result, a tree-like graph representation is generated.

The analytics pipelines generated by the analytics composition layer 130 may be stored in an analytics pipeline repository 180 in association with indicators of the type of requested operation and characteristics of the input received upon which the operation is performed. While shown as separate from the analytics repository 160, the analytics pipeline repository 180 may be part of the analytics repository 160 and an analytics pipeline may comprise one or more analytics. The analytics pipeline repository 180 may also be indexed in the analytics pipeline index 190, similar to the analytics repository 160, for searching, where the index may specify a searchable subset of characteristics of the analytics pipelines. Thus, when the analytics composition layer 130 is attempting to compose an analytics pipeline for a received request to perform an operation on input data, the analytics composition layer 130 may search the analytics pipeline index 190 to identify a previously generated analytics pipeline that provides the analytics required to perform the operation requested on the type of input data received with the request. In such a case, if a previously generated analytics pipeline is identified, then composition of a new analytics pipeline by the analytics composition layer is not required and the corresponding DAG may be provided to the analytics execution layer 140.

The analytics execution layer 140 receives the definition of the analytics pipeline specified, for example, in the directed acyclic graph, and determines how to distribute the analytics to different data processing systems or computing devices in a cluster or network of data processing systems or computing devices. The logic of the analytics execution layer 140 may evaluate current resource availability at the different data processing systems or computing devices, e.g., CPU, memory, bandwidth, etc., as well as the information in the analytics registry 160 and analytics pipeline registry 180 for the analytics, such as which analytics run better on GPUs, what resources the analytics utilize, the use of cached data, etc., and optimizes the execution according to that information, e.g., by determining which analytics will be performed on which machines and when. In some illustrative embodiments, the logic of the analytics execution layer 140 may evaluate the DAG representing the analytics pipeline with regard to various other types of efficiencies for distributing the analytics to the various data processing systems or computing devices including what portions of the analytics pipeline are parallelizable (and thus can be distributed to different data processing systems or computing devices), what portions are not parallelizable but for which the in-memory data may be useable by subsequent analytics (which indicates that the analytics should be assigned to the same data processing system or computing device), and the like.

The analytics runtime layer 150 coordinates and executes the analytics pipeline using the distribution plan generated by the analytics execution layer 140. The analytics runtime layer 150 may coordinate the sending of data, control information, and the like, to orchestrate the operation of the various data processing systems or computing devices to achieve the operation to be performed by the analytics pipeline. The analytics runtime layer 150 may then return the results of the operation performed by the analytics pipeline to the requestor that submitted the original request for the operation. For example, in a medical imaging study analysis, the original request may be received from a computing device associated with a medical professional and may specify a type of operation to be performed and on what input data to perform the operation, and the framework 100 may return the results of that operation, as generated by the analytics pipeline, to the computing device associated with the medical professional.

Thus, the illustrative embodiments provide mechanisms for wrapping analytics in various programming languages such that a unified interface is provided for execution of the analytics on various data processing systems or computing devices. The illustrative embodiments further register the wrapped analytics in an analytics repository that is searchable to generate analytics pipelines. The illustrative embodiments generate the analytics pipelines and a corresponding hierarchical representation of the analytics in the pipeline, e.g., a DAG or other tree-like data structure, which is then used to execute the analytics pipeline in a distributed data processing environment, on a cluster of computing devices, or the like. These operations will be further described with reference to FIGS. 2-5 hereafter.

Figure 2:
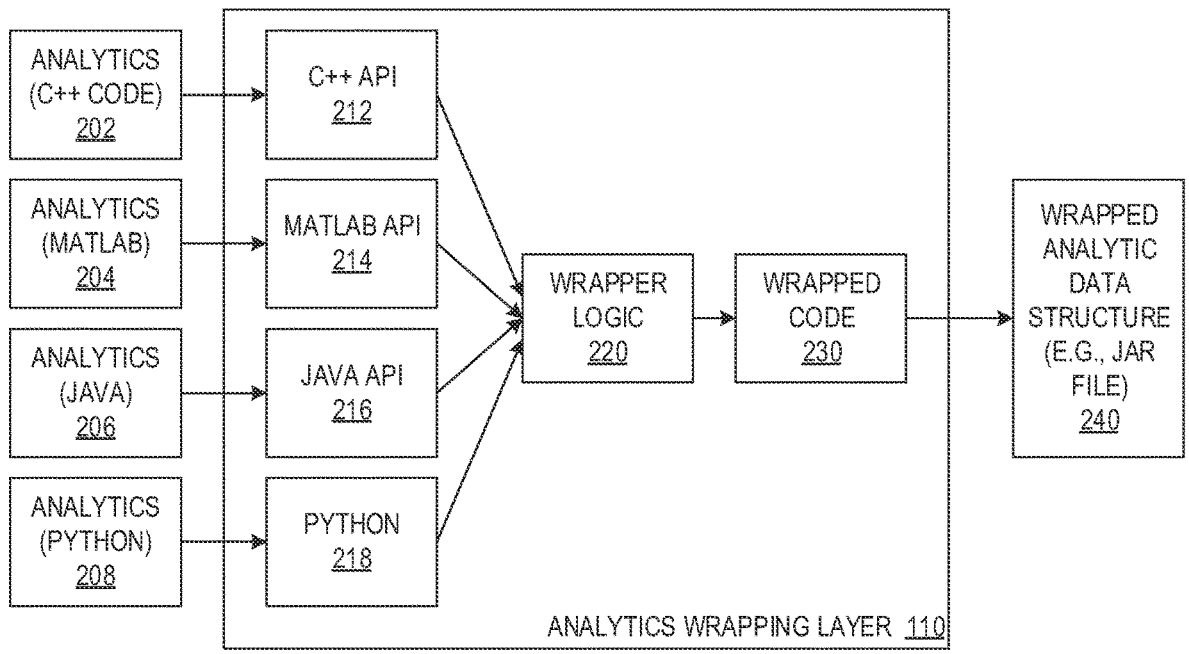
FIG. 2 is an example diagram illustrating an analytics wrapper layer of the multiple-layer analytics framework in accordance with one illustrative embodiment.

FIG. 2 is an example diagram illustrating an analytics wrapper layer of the multiple-layer analytics framework in accordance with one illustrative embodiment. As shown in FIG. 2, the analytics wrapper layer 110 comprises logic for implementing a plurality of application programming interfaces (APIs) for various programming languages, e.g., a C++ API 212, a Matlab API 214, a Java API 216, and a Python API 218. The analytics wrapper layer 110 receives an analytic 202-208 in one of the programming languages via a corresponding API 212-218. The APIs 212-218 provide a unified form to represent the input parameters and configuration for analytics as well as logic for obtaining results of previous analytics that are needed for the current analytic. The APIs 212-218 also provide a unified form to write the analytics results and explanation. The corresponding API 212-218 outputs the received analytic 202-208 to the unified interface wrapper logic 220 which applies a wrapper to the analytic 202-208 based on the programming language of the analytic 202-208. The unified interface wrapper logic 220 outputs wrapped analytic code 230 which is then packaged into an analytics data structure 240 for registration and distribution to data processing systems for execution. Thus, the wrapper logic 220 provides a unified interface for analytics that is independent of the programming language, leading to the ability to execute analytics regardless of the original programming language of the analytics.

In one illustrative embodiment, the unified interface wrapper logic 220 may apply a Java programming language based wrapper to the analytics code 202-208. In such an embodiment, the analytics data structure 240 may be an analytics Java Archive (JAR) file, for example. Thus, the analytics wrapping layer 110 may wrap the analytics code, e.g., C++ code, Matlab code, Java code, Python code, or the like, in a Java wrapper to generate wrapped code 230 and ultimately the analytics data structure 240. The analytics wrapping layer 110 thus provides (1) a domain template independent from the analytics programming language, (2) a unified interface for input, output, explanation, and previous analytics information, (3) the ability to automatically generate the wrapper when the information for the wrapper can be deduced from documentation and registries, and (4) multi-modal analytics support.

Figure 3:
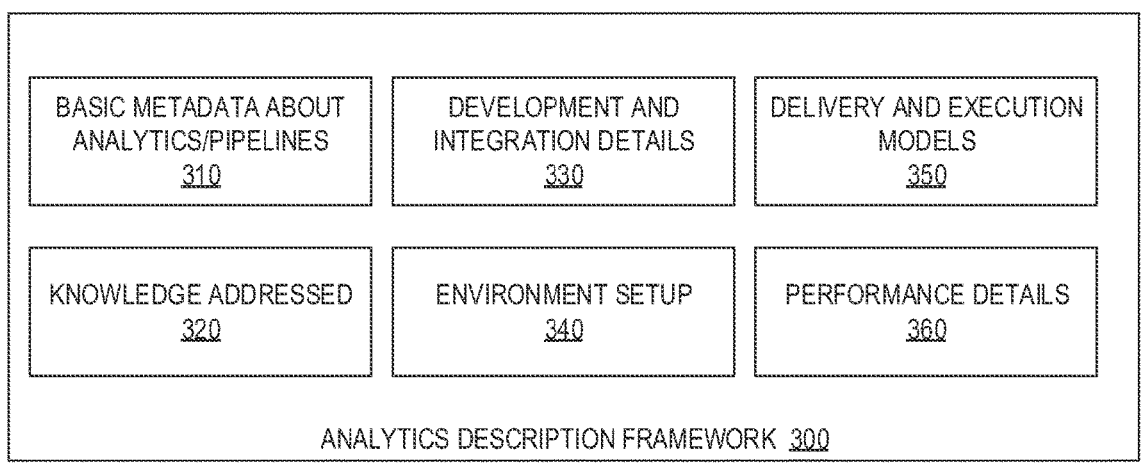
FIG. 3 is an example diagram illustrating an analytics description framework in accordance with one illustrative embodiment.

FIG. 3 is an example diagram illustrating an analytics data model in accordance with one illustrative embodiment. The analytics data model 300 captures the basic metadata about the analytics and/or the analytics pipelines with which the analytics are usable 310, knowledge addressed by the analytic 320, development and integration details for the analytic 330, environment setup details for the analytic 340, analytics delivery and execution models 350, and performance details 360. This information for the analytics data model 300 may be extracted automatically from documentation data structures received along with an analytic for registration in the analytics registry 160. Moreover, some of this information may be extracted from the code of the analytic itself, such as via introspection on the code. In addition, this information, or a portion of this information, may be manually entered by a user. The analytics data model 300 may be provided as metadata or an associated data structure in association with the wrapped analytics code 230 or analytics data structure 240 generated by the analytics wrapping layer 110. The analytics data model 300 may be utilized to determine how to combine analytics into pipelines and to assign analytic execution to specific computing resources, e.g., specific computing machines.

As shown in FIG. 3, assuming a medical imaging analytics implementation, the basic metadata about the analytics and/or the pipelines 310 may comprise information about what tasks the analytic is suitable for, e.g., module breakup with regard to mode recognition, viewpoint recognition, segmentation, and the like. The metadata 310 may further comprise details on the types of medical images expected, which may be specified as a Digital Imaging and Communications in Medicine (DICOM) header or other standard for medical images. For example, the expected types of images may include characteristics such as whole image or region of interest (ROI) (i.e. does the analytic work on a zoom-in portion of the image?), color or gray level (bit-depth in general), modality (CT, MRI, X-ray, Sonogram, etc.), specialty (e.g., cardiac, breast, etc.), with or without contrast (e.g., whether or not the analytic expects only contrast-enhanced images), expected modes (T1, T2, color Doppler, etc.), and dimensionality expected (e.g., 2D, 3D, etc.). These are only examples of the metadata specifying the types of images expected to be used with the analytic.

In addition, the basic metadata 310 may further include algorithm details of the analytic, such as the algorithm name, an algorithm reference or citation, and the like. The basic metadata 310 may further specify constraints or assumptions made in the analytic.

The knowledge addressed metadata 320 may specify information as to what concepts and/or relationships the analytic may extract, which can be used as a basis for correlating the analytic with information provided in clinical knowledge. The knowledge addressed metadata 320 may further specify what visual features the analytic extracts, what question types the analytic may address, for what diseases and/or anomalies the analytic is suitable, and what portion of anatomy of a patient the analytic is used, e.g., a finer granularity specification than the specialty, such as pulmonary artery, left ventricle, etc.

The development and integration details metadata 330 may specify various information about the development and integration of the analytic including, for example, the development API such as the functions of methods exposed in the API and API details of exposed methods. The integration details of the development and integration details metadata 330 may specify inputs, outputs, structured parameter lists, unstructured parameter lists, configuration information, and various settings for the analytic.

The environment setup metadata 340 may specify various environment information including, for example, library dependencies, operating system details, memory and computational requirements, installation pre-requisites, and the like. The delivery and execution model metadata 350 may specify various information about how the analytic is delivered to an execution environment, and on what types of frameworks the analytic may execute. For example, the delivery and execution model metadata 350 may specify in what form the code of the analytic is available, e.g., Java API, shared JARs, Runnable JARs, Wrappers JARS, REST service, or the like, and on what frameworks the analytic will run, e.g., UIMA, Watson, compute clusters, or the like. The performance details metadata 360 specifies information such as on what datasets the analytic has been tested, what metrics the analytic uses, what accuracies the analytic generates, CPU performance, memory performance, and the like. This information may be used by the mechanisms of the illustrative embodiments to determine which analytics to combine into pipelines and how, at least by identifying which outputs fit with which inputs. This information may also be used to assign analytics to the correct computing resources, e.g., machines, for execution. For example, using graph and scheduling algorithms, algorithms that require special resources will be assigned to the appropriate computing resource or machine providing the required resources.

Figure 4:
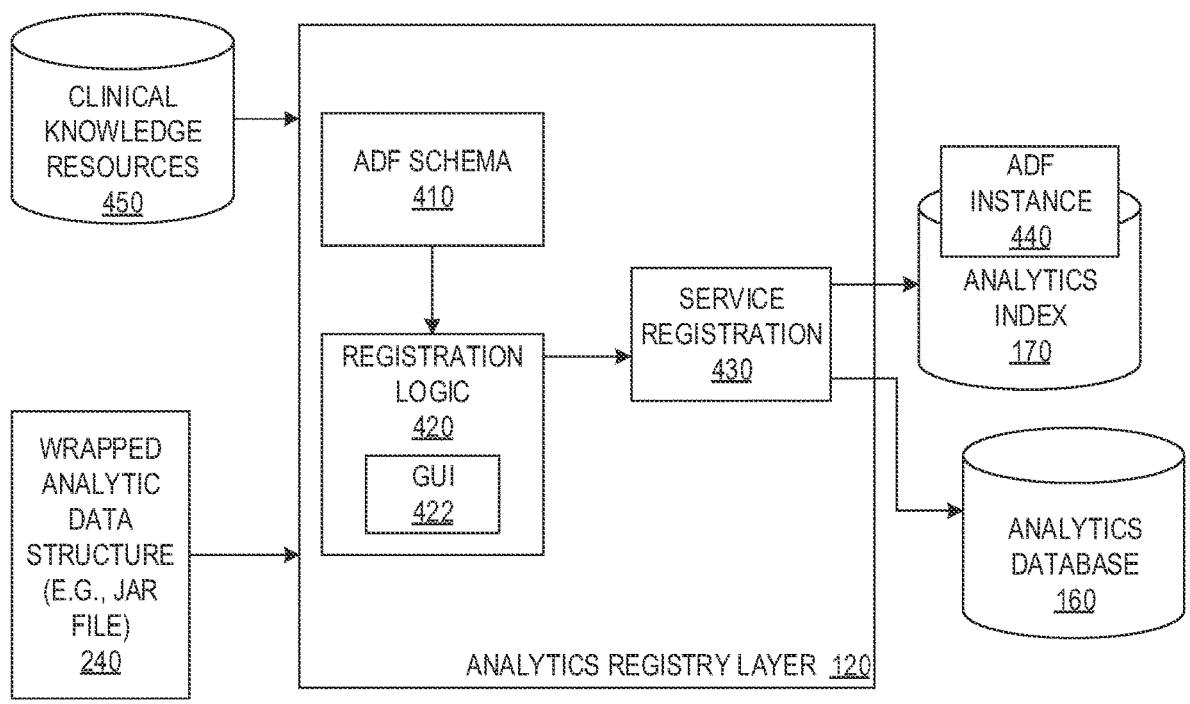
FIG. 4 is an example diagram illustrating an analytics registration process in accordance with one illustrative embodiment.

FIG. 4 is an example diagram illustrating an analytics registration process in accordance with one illustrative embodiment. As shown in FIG. 4, the analytics registration layer 120 receives the analytic data structure 240 for a given analytic, and further accesses clinical knowledge resources 450, as input. The analytic data structure 240 is processed by analytic registration logic 420 based on a specified analytic data model schema 410, also referred to as an analytic description framework (ADF) schema, such as shown in FIG. 3. That is, the ADF schema 410 is used to correlate information in the analytics data structure 240, or extracted from the analytics code via introspection or the like, with corresponding elements of the ADF schema 410. The clinical knowledge resources 450 may also be correlated by the analytic registration logic 420 with analytics information via the ADF schema 410. In one illustrative embodiment, the clinical knowledge resources 450 may be a registry that includes clinical concepts, assertions, and rules. The analytics registration logic 420 may use this information of the clinical knowledge resources 450 to deduce analytics output with the analytics registration logic 420 placing the analytic and metadata/information about the analytic in an analytics registry and adding the information to the registry index.

The analytic registration logic 420 may perform such operations automatically or semi-automatically. The analytic registration logic 420 may provide a registration graphical user interface (GUI) 422 through which a user may provide user input to authorize and/or augment the correlation of ADF schema 410 with information obtained from the analytics data structure 240 and clinical knowledge resources 450. Via the GUI 422, a user may be presented with results of the automatic correlation of information from the analytics data structure 240 and the clinical knowledge resources 450 for confirmation and/or editing. For example, in some cases, some information fields in the ADF schema 410 may not be populated with information obtained from the analytics data structure 240 or the clinical knowledge resources 450 and thus, the user may populate such fields with appropriate information based on the user's own knowledge. The resulting ADF instance 440 may be provided to service registration logic 430 which then registers the analytic data structure 240 and the ADF instance 440 with the analytics repository 160 and analytics index 170.

Figure 5A:
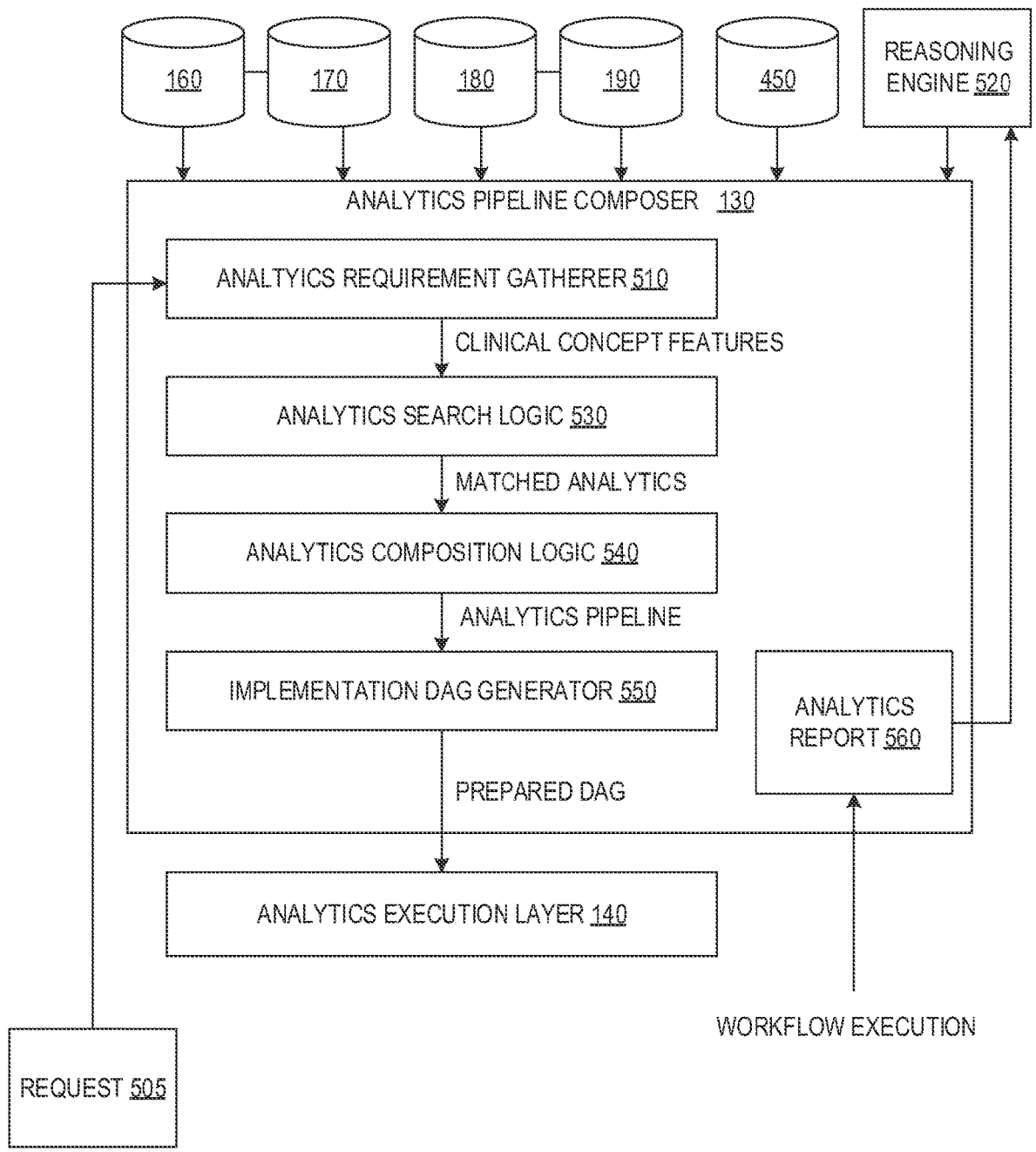
FIG. 5A is an example diagram illustrating an analytics pipeline composer in accordance with one illustrative embodiment.

FIG. 5A is an example diagram illustrating an analytics pipeline composer in accordance with one illustrative embodiment. As shown in FIG. 5A, the analytics composition layer 130 comprises analytics requirement gathering logic 510 which operates on a received request 505 that requests to perform an analytics based operation on a provided set of input data. The analytics requirement gathering logic 510 determines characteristic of what type of operation is requested and the characteristics of the input data upon which the requested operation is performed. For example, a user may request that analytics on a specified medical imaging study be performed to provide decision support for diagnosing cardiac anomalies in the medical imaging study. Moreover, from the input data set specified by the request, or provided along with the request, it may be determined what characteristics of the medical imaging study are, e.g., color or gray level, modality, specialty, contrast, mode of image, dimensionality, etc. This information may be extracted from metadata associated with the medical imaging study data files.

The analytics requirement gatherer logic 510 may further utilize clinical knowledge resources 450 to provide information as to the types of clinical concepts involved in the performance of the requested operation. For example, when performing analytics on medical imaging studies for decision support regarding cardiac anomalies, the clinical knowledge resources 450 may provide information as to the clinical concepts of proper/anomalous anatomical structure measurements, proper/anomalous anatomical distances, coloring, medical image based features of particular cardiac diseases, etc. In general, the clinical knowledge resources 450 provide clinical concepts, their relationships, assertions, and guidelines, which can be used to compose analytics pipelines. Moreover, a cognitive engine 520 may be utilized to evaluate the request and determine the clinical concepts and features that are pertinent to determining what analytics should be used to provide the requested operation.

The analytics search logic 530 receives the clinical concept features and other characteristics of analytics that are required to provide the requested analytics operation on the input data set and performs a search of the pipeline database 180 based on the pipeline database index 190 to determine if there is a previously generated analytics pipeline that may be utilized to perform the requested operation on the type of input data set associated with the request 505. For example, the clinical concept features and characteristics of the analytics may be used as a basis to search the index 190 to identify a corresponding pipeline in the database 180 that has corresponding characteristics matching those of the clinical concept features and other characteristics of the required analytics for the requested operation. If a matching pipeline is identified through the search, the analytics search engine 530 may retrieve the pipeline and its corresponding DAGs which are then output to the analytics execution layer 140, effectively bypassing the analytics composition logic 540 and DAG generator 550.

In the event that a matching pipeline is not found, the analytics search logic 530 may search the registered analytics in the repository 160 by searching the analytics index 170, to identify analytics that match one or more of the clinical concept features or other characteristics of required analytics for the analytics pipeline needed to perform the requested operation on the input data set. For example, for breast analytics, the analytics index 170 may be searched for clinical concept features/characteristics of clinical and text analytics, mammography image analytics, ultrasound image analytics, and analytics that combine the results of these.

Each of the analytics matching one or more of the clinical concept features or other characteristics of required analytics for the analytics pipeline are identified and provided to the analytics composition logic 540. The analytics composition logic 540 further analyzes the clinical knowledge resources 450 and the analytics identified as results of the analytics search to determine which analytics may be paired to cause the output of one analytic to provide the required input for the next analytic. For example, the inputs and outputs of the various analytics may be evaluated to determine which analytics provide outputs that match inputs required by other analytics, which analytics do not require outputs from other analytics given requirements and clinical concepts used to define analytics pipelines, etc. The criteria for composing analytics pipelines may be machine learned through a training process and/or may be determined through a semi-automatic process where a user is partially involved. It should be appreciated that multiple pairings may be combined to generate a string of analytics in excess of two, e.g., analytic A is paired with analytic B, which in turn is paired with analytic C resulting in a string of analytics A, B, C.

Figure 5B:
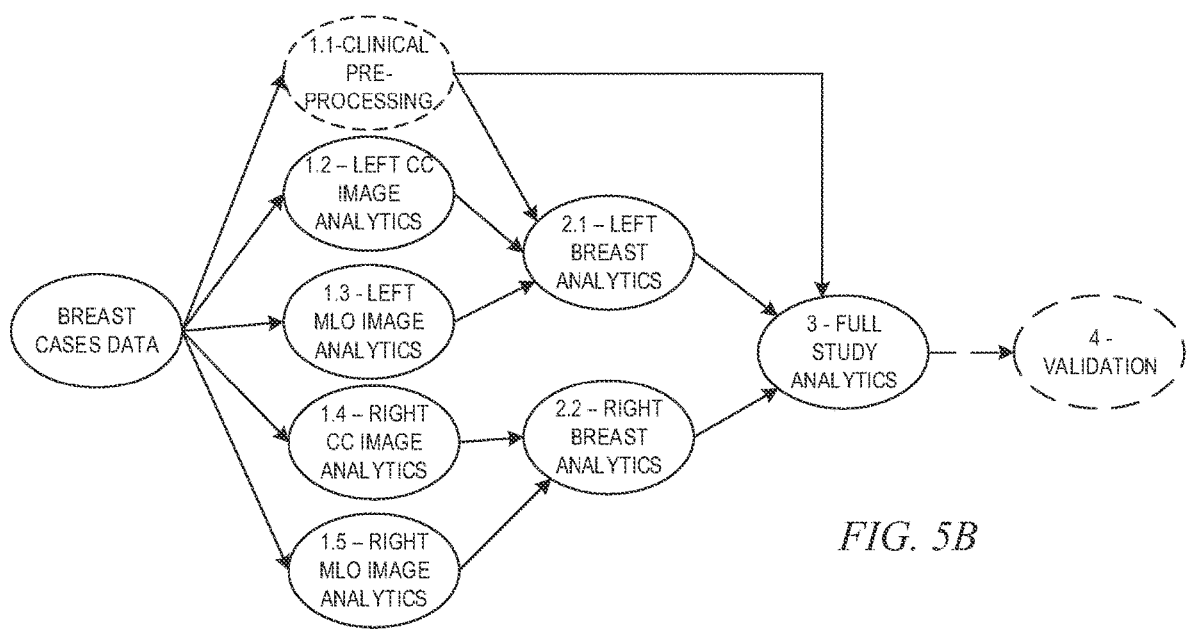
FIG. 5B is an example diagram of a directed acyclic graph (DAG) of an analytics pipeline in accordance with one illustrative embodiment.

A grouping of the pairings, or strings, of analytics generates a pipeline of analytics that may be represented as a hierarchical data structure identifying dependencies between analytics. This grouping may be represented as a directed acyclic graph (DAG) showing the dependencies and the flow of data between analytics in the pipeline. FIG. 5B is an example diagram illustrating a DAG of an analytics pipeline in accordance with one illustrative embodiment. As shown in FIG. 5B, the DAG is for a breast case analytics pipeline in which the analytics 1.1-1.5 may be performed in parallel. Thereafter, the analytics 2.1-2.2 may also be performed in parallel. Thereafter, analytics 3 and 4 may be performed in sequence as shown. The DAG generator 550 generates the DAG for the analytics pipeline which may then be used to execute the analytics pipeline, at the analytics execution layer 140 and analytics runtime layer 150, in a distributed data processing environment.

After execution of the analytics pipeline either retrieved or generated by the logic of the analytics composition layer 130, an analytics report 560 may be returned to the analytics composition layer 130. The report 560 provides feedback about the actual execution and contains which analytics were executed, how long the execution took, and what the results of the analytics were. This information in the report 560 may be used to improve the pipeline composition in the next performance of the analytics composition operation. That is, the reasoning or cognitive engine 520 may perform machine learning based on the analytics report 560 to modify its operation when being used to assist with analytics requirement gatherer 510 operations and/or analytics composition logic 540 operations.

Thus, the analytics requirement gatherer 510 defines a goal for the system and this is used to search for analytics and derive pipelines that need to be composed. For example, assume that a requirement is to determine whether a specific medical imaging study indicates malignancy. By finding clinical concepts and querying clinical knowledge, it is determined that the medical imaging study is a breast mammography and clinical data and imaging data need to be analyzed. The analytics registry is then searched for breast clinical analytics and breast imaging analytics and a corresponding pipeline is composed, such as shown in FIG. 5B, for example. Reasoning engine 520 will then take the results of all the analytics of the composed pipeline and predict whether the given medical imaging study indicates malignancy or not.

As noted above, once the analytics composition layer 130 generates the DAG for the analytics pipeline, it is provided to the analytics execution layer 140. The pipeline may also be stored and indexed in the pipeline database 180 and index 190 for later retrieval should a similar request be received in the future. The analytics execution layer 140 determines, based on the DAG, the manner by which to distribute the analytics of the analytics pipeline to various data processing systems and/or computing devices in a distributed data processing environment so as to achieve the desired operation results. The analytics runtime layer 150 orchestrates and coordinates the execution of the analytics as well as the collection of results which may then be presented to the requestor as a response to the request.

From the above discussion, it is apparent that the illustrative embodiments may be utilized in many different types of data processing environments, and primarily in a distributed data processing environment. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

Figure 7:
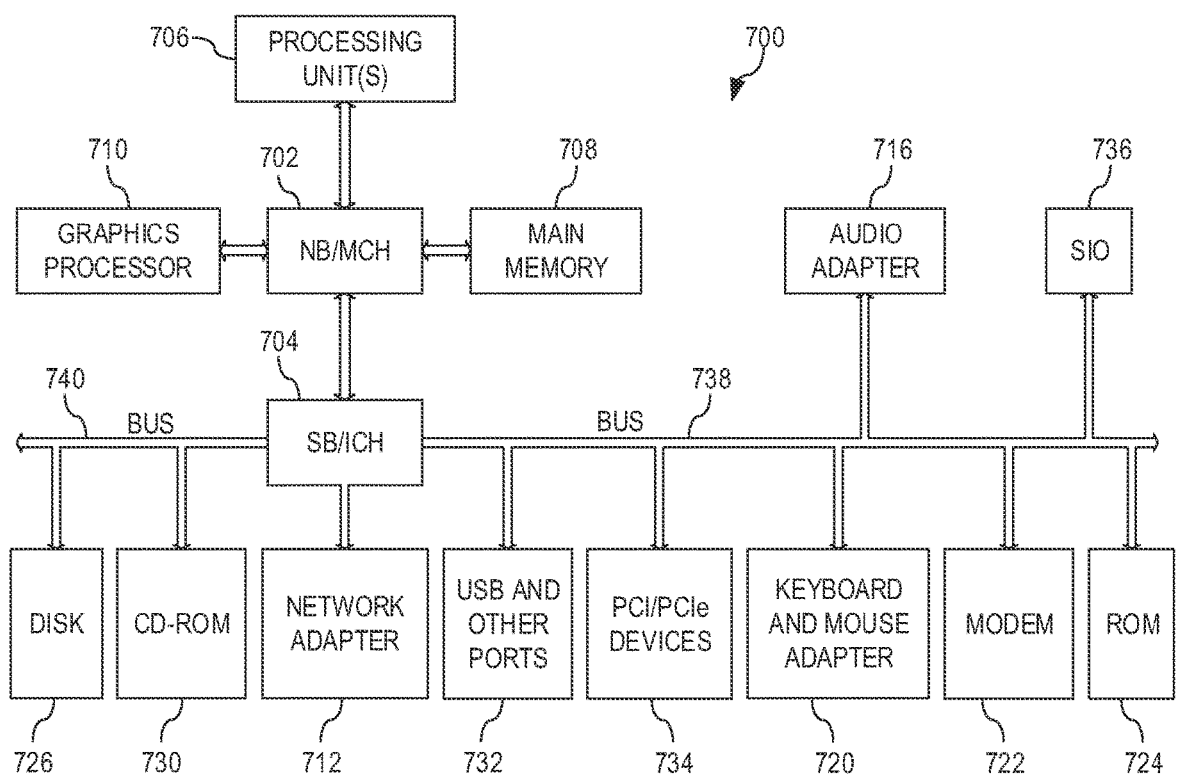
FIG. 7 is a block diagram of an example data processing system in which aspects of the illustrative embodiments are implemented.
Figure 6:
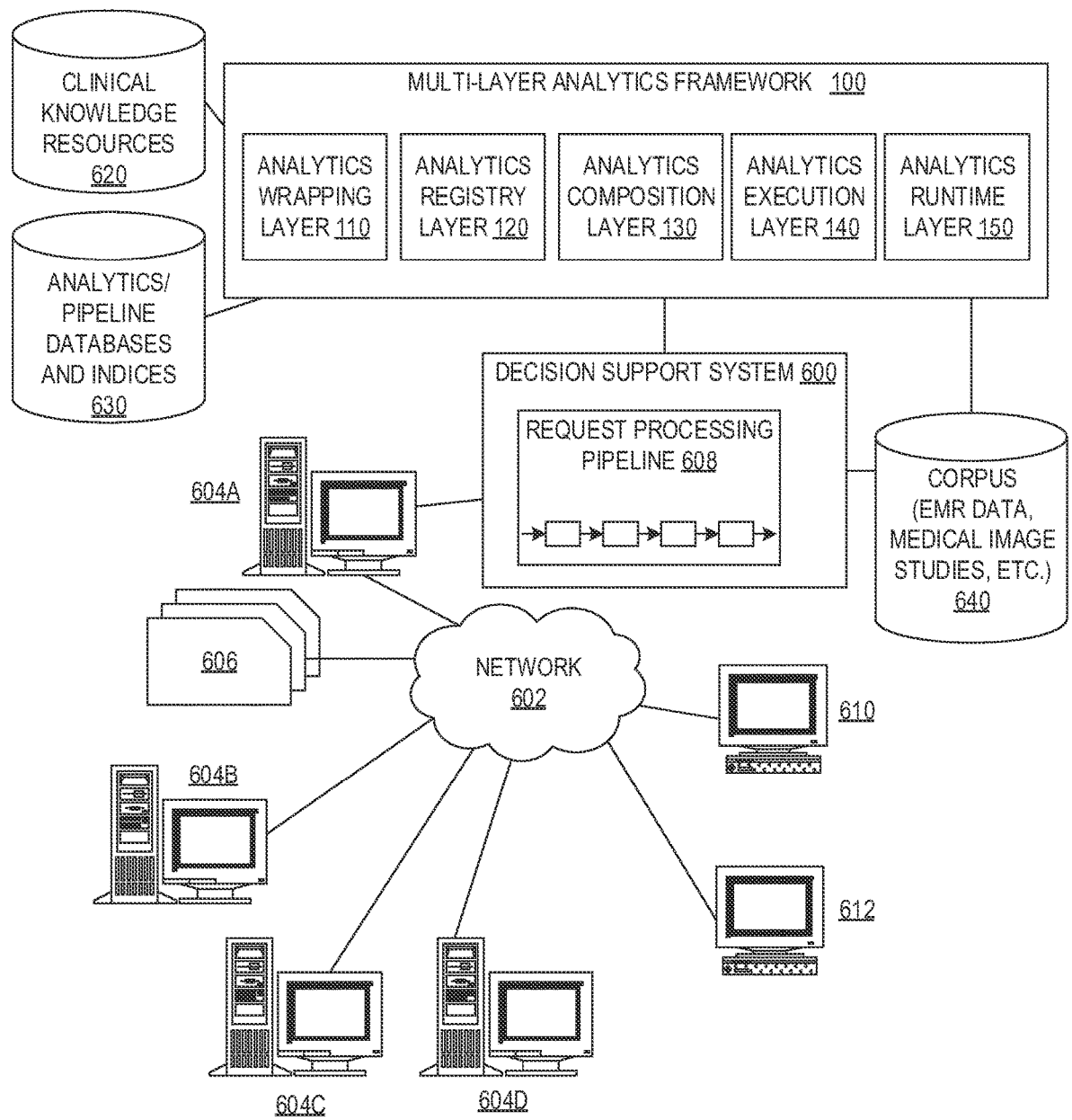
FIG. 6 depicts a schematic diagram of one illustrative embodiment of a cognitive medical imaging analytics system in accordance with one illustrative embodiment.

FIGS. 6-7 are directed to describing an example decision support system for medical imaging study analytics applications, which implements a request processing pipeline, request processing methodology, and request processing computer program product with which the mechanisms of the illustrative embodiments are implemented. These requests may be provided as structure or unstructured request messages, natural language questions, or any other suitable format for requesting an operation to be performed by the decision support system. As described in more detail hereafter, the particular decision support application that is implemented in accordance with one illustrative embodiment is a medical imaging study analytics application in which an analytics pipeline is generated and applied to one or more medical imaging studies to provide information to a medical professional as part of a decision support operation.

The decision support system may make use of or implement cognitive system technology to not only process the initial request to determine what the initial request is asking to be done, but may also process the input data, a corpus of information that assists or is a basis for performing decision support operations, or the like, to emulate human thought processes when evaluating input data sets, such as a medical imaging study. Thus, a brief discussion of cognitive systems will be provided herein as exemplary of cognitive systems that may be utilized with the decision support system of the illustrative embodiments.

It should be appreciated that the decision support system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. In the context of a medical imaging study analytics based decision support system whose purpose is to perform complex and processor intensive analytics on medical images and provide results to a medical professional for review when treating a patient, various pipelines may be provided for handling different types of medical imaging studies. For example, in some cases, a first request processing pipeline may be trained and configured to operate on input requests directed to cardiac medical imaging studies while another request processing pipeline may be trained and configured to process requests directed to breast medical imaging studies or brain medical imaging studies. Moreover, in some cases, one pipeline may be associated with performing analytics for one type of medical anomaly detection while another may be associated with performing analytics for a different type of medical anomaly detection. Any separation of responsibilities between multiple request processing pipelines may be utilized without departing from the spirit and scope of the present invention.

Moreover, each request processing pipeline may have their own associated corpus or corpora that they ingest and operate on, e.g., one corpus for medical documents, medical knowledge bases, clinical rules, etc. for processing medical images directed to the brain, and another corpus or corpora for such information directed to another anatomical structure such as the lungs or heart. The decision support system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

One type of request processing pipeline with which the mechanisms of the illustrative embodiments may be utilized is a Question Answering (QA) pipeline. While a QA pipeline is one example of a request processing pipeline that may be augmented to include mechanisms in accordance with one or more illustrative embodiments, it should be appreciated that the illustrative embodiments are not limited to such. Rather, the mechanisms of the illustrative embodiments may operate on requests that are not posed as "questions" but are formatted as requests for the decision support system to perform analytics based operations on a specified set of input data using the associated corpus or corpora and the specific configuration information used to configure the decision support system, i.e. the multilayer analytics framework with which the decision support system and request processing pipeline(s) operate. For example, rather than asking a natural language question of "What cardiac anomalies are present in medical imaging study X for patient P?", the cognitive system may instead receive a request of "generate cardiac anomaly report for medical imaging study X of patient P," or the like.

The illustrative embodiments may be integrated in, augment, and extend the functionality of the request processing pipeline, or QA pipeline in some implementations, of the decision support system with regard to providing a multilayer analytics framework that can combine analytics from a variety of sources, and potentially provided in different programming languages, into analytics pipelines that are generated for performing requested analytics based operations on an input set of data. The multi-layer analytics framework wraps analytics in a unified interface wrapper, registers the analytics in an analytics registry, and provides logic for searching for and combining analytics into a composed analytics pipeline designed to achieve a desired result corresponding to a requested operation. The multi-layer analytics framework further provides mechanisms for distributing the execution of the analytics pipeline to a plurality of data processing systems or computing devices in a networked or clustered computing environment (collectively referred to as a distributed data processing environment), and obtaining the results to generate a response to the original request.

For example, the multi-layer analytics framework may be integrated in a request processing pipeline, such as part of a hypothesis generation stage of execution, evidence scoring stage of execution, or any other suitable stage of operation of the request processing pipeline. The multi-layer analytics framework may be invoked by the decision support system or request processing pipeline to perform analytics on the input data set, e.g., a medical imaging study of a patient, and provide results back to the decision support system which then performs further decision support operations on the results. For example, in some cases, the decision support system may generate a user interface through which the results are presented to a user for review and use in treating a patient. The user interface may present one or more medical images of the medical imaging study, contain bounding boxes, highlighting, or other conspicuous indications of anomalies in medical images, if any, present anatomical measurements obtained from analysis of the medical images, potential diagnoses, treatment recommendations, and the like.

As the illustrative embodiments may be utilized with, and even integrated with, a cognitive system for processing user requests and providing decision support, it is important to have an understanding of how a cognitive system and request processing pipeline may be implemented. It should be appreciated that the mechanisms described in FIGS. 6-7 are only examples and are not intended to state or imply any limitation with regard to the type of cognitive system mechanisms with which the illustrative embodiments are implemented. Many modifications to the example cognitive system shown in FIGS. 6-7 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like. In the context of the present invention, the cognitive system operates in conjunction with the multi-layer analytics framework, or is integrated with the multi-layer analytics framework, to generate analytics pipelines to perform analytics based operations and generate results in response to requests for such analytics based operations to be performed on a specified input data set. In particular, in some illustrative embodiments, the cognitive system operates in conjunction with the multi-layer analytics framework, or is integrated with the multi-layer analytics framework, to generate analytics pipelines for medical imaging study analytics based operations that are performed on medical imaging studies of patients to identify salient medical images, identify anomalies in medical images, provide anatomical measurements, and any other medical imaging based decision support operation.

IBM Watson™ is an example of one cognitive system which may be utilized with the mechanisms of the illustrative embodiments. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions and process requests based on natural language and specific evidence In one aspect, cognitive systems provide mechanisms for processing requests submitted to them, or questions posed to these cognitive systems, using a request processing pipeline. The request processing pipeline or system is an artificial intelligence application executing on data processing hardware that performs analysis pertaining to a given subject-matter domain. The pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the pipeline. The document may include any file, text, article, data structure, or other source of data for use in the cognitive system. For example, a pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input requests, or questions, to cognitive system which implements the request processing pipeline. The pipeline then processes the request, or answers the input question, using the content in the corpus of data by evaluating documents, sections of documents, portions of data in the corpus, or the like.

As will be described in greater detail hereafter, the request processing pipeline receives an input request, parses the request to extract the major features of the request, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input request, or question, based on the specific area of focus of that reasoning algorithm. Each resulting score is then weighted against a statistical model. The statistical model captures how well the reasoning algorithm performed at establishing the inference between two similar passages for a particular domain during the training period of the request processing pipeline. The statistical model is used to summarize a level of confidence that the request processing pipeline has regarding the evidence that the potential response, or candidate answer, is inferred by the request/question. This process is repeated for each of the candidate responses/answers until the pipeline identifies candidate responses/answers that surface as being significantly stronger than others and thus, generates a final response/answer, or ranked set of responses/answers, for the input request/question.

In the context of the present invention, the formulation of queries in the request processing pipeline may include the identification of clinical concept features and other characteristics of analytics required to perform the requested analytics based operation specified in the input request, e.g., the operation of the analytics requirement gatherer 510 in FIG. 5A. The reasoning algorithms may comprise the algorithms utilized by the analytics requirement gatherer logic 510 and/or analytics search logic 530 to identify clinical concept features and characteristics of analytics. The resulting queries and their application to the corpus may comprise performing the analytics search, such as by analytics search logic 530 in FIG. 5, where the corpus may comprise the repositories and indices 160-190 as well as the clinical knowledge resources 450, for example. The resulting hypotheses may be the particular analytics identified by way of the search which may then be evaluated by the analytics composition logic 540 to generate a final response comprising the analytics pipeline and its associated DAG, for example.

Alternatively, the multi-layer analytics framework may be utilized as analytics support for performing request processing or natural language question answering by the request processing or question answering pipeline of the decision support system. That is, the pipeline may operate on other data of the corpus, e.g., patient EMR data, while the multi-layer analytics framework performs analytics based operations to supplement the operation of the pipeline. The results of both operations may be combined in the decision support system to generate a combined representation of the status of the particular patient both with regard to the patient's EMR information and the medical imaging study analytics.

FIG. 6 depicts a schematic diagram of one illustrative embodiment of a cognitive system 600 implementing a request processing pipeline 608, which in some embodiments may be a question answering (QA) pipeline, in a computer network 602. For purposes of the present description, it will be assumed that the request processing pipeline 608 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 600 is implemented on one or more computing devices 604A-D (comprising one or more processors and one or more memories, and potentially any other computing device elements generally known in the art including buses, storage devices, communication interfaces, and the like) connected to the computer network 602. For purposes of illustration only, FIG. 6 depicts the cognitive system 600 being implemented on computing device 604A only, but as noted above the cognitive system 600 may be distributed across multiple computing devices, such as a plurality of computing devices 604A-D. The network 602 includes multiple computing devices 604A-D, which may operate as server computing devices, and 610-612 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 600 and network 602 enables question processing and answer generation (QA) functionality for one or more cognitive system users via their respective computing devices 610-612. In other embodiments, the cognitive system 600 and network 602 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 600 may be used with components, systems, subsystems, and/or devices other than those that are depicted herein.

The cognitive system 600 is configured to implement a request processing pipeline 608 that receive inputs from various sources. The requests may be posed in the form of a natural language question, natural language request for information, natural language request for the performance of a cognitive operation, or the like. For example, the cognitive system 600 receives input from the network 602, a corpus or corpora of electronic documents 606, cognitive system users, and/or other data and other possible sources of input. In one embodiment, some or all of the inputs to the cognitive system 600 are routed through the network 602. The various computing devices 604A-D on the network 602 include access points for content creators and cognitive system users. Some of the computing devices 604A-D include devices for a database storing the corpus or corpora of data 606 (which is shown as a separate entity in FIG. 6 for illustrative purposes only). Portions of the corpus or corpora of data 606 may also be provided on one or more other network attached storage devices, in one or more databases, or other computing devices not explicitly shown in FIG. 6. The network 602 includes local network connections and remote connections in various embodiments, such that the cognitive system 600 may operate in environments of any size, including local and global, e.g., the Internet.

In one embodiment, a content creator creates content in a document of the corpus or corpora of data 606 for use as part of a corpus of data with the cognitive system 600. The document includes any file, text, article, or source of data for use in the cognitive system 600. Moreover, in accordance with the illustrative embodiments, content of the corpus or corpora of data 606 may be automatically generated by computing devices and systems based on their respective operations. For example, in a medical imaging implementation, medical imaging devices, systems, and the like, may be used to capture images of various modalities, views, modes, and the like, of a patient and these images may be rendered as data structures in the corpus or corpora of data 606. Moreover, patient electronic medical records (EMRs), drug prescription fulfillment information, and the like, may all be collected from various sources of medical and drug information, e.g., hospital computing systems, pharmacy computing systems, doctor office computing systems, health insurance company systems, and the like, and may be considered part of this corpus or corpora 606.

Decision support system users access the cognitive system 600 via a network connection or an Internet connection to the network 602, and input questions/requests to the decision support system 600 that are answered/processed based on the content in the corpus or corpora of data 606. In one embodiment, the questions/requests are formed using natural language. The decision support system 600 parses and interprets the question/request via a pipeline 608, and provides a response to the decision support system user, e.g., decision support system user 610, containing one or more answers to the question posed, response to the request, results of processing the request, or the like. In some embodiments, the decision support system 600 provides a response to users in a ranked list of candidate answers/responses while in other illustrative embodiments, the decision support system 600 provides a single final answer/response or a combination of a final answer/response and ranked listing of other candidate answers/responses.

The decision support system 600 implements the pipeline 608 which comprises a plurality of stages for processing an input question/request based on information obtained from the corpus or corpora of data 606. The pipeline 608 generates answers/responses for the input question or request based on the processing of the input question/request and the corpus or corpora of data 606.

In some illustrative embodiments, the decision support system 600 may be the IBM Watson™ cognitive system available from International Business Machines Corporation of Armonk, N.Y., which is augmented with the mechanisms of the illustrative embodiments described herein for providing and performing multi-layer analytics. As outlined previously, a pipeline of the IBM Watson™ cognitive system receives an input question or request which it then parses to extract the major features of the question/request, which in turn are then used to formulate queries that are applied to the corpus or corpora of data 606. Based on the application of the queries to the corpus or corpora of data 606, a set of hypotheses, or candidate answers/responses to the input question/request, are generated by looking across the corpus or corpora of data 606 for portions of the corpus or corpora of data 606 (hereafter referred to simply as the corpus 606) that have some potential for containing a valuable response to the input question/response (hereafter assumed to be an input question). The pipeline 608 of the IBM Watson™ cognitive system then performs deep analysis on the language of the input question and the language used in each of the portions of the corpus 606 found during the application of the queries using a variety of reasoning algorithms.

The scores obtained from the various reasoning algorithms are then weighted against a statistical model that summarizes a level of confidence that the pipeline 608 of the IBM Watson™ cognitive system 600, in this example, has regarding the evidence that the potential candidate answer is inferred by the question. This process may be repeated for each of the candidate answers to generate a ranked listing of candidate answers/responses which may then be presented to the user that submitted the input question/request, e.g., a user of client computing device 610, or from which a final answer/response is selected and presented to the user. More information about the pipeline 608 of the IBM Watson™ cognitive system 600 may be obtained, for example, from the IBM Corporation website, IBM Redbooks, and the like.

For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In the context of the present invention, decision support system 600 may provide a cognitive functionality for assisting with various types of decisions that need to be made by human beings and provides information to support such decision making. In particular, some illustrative embodiments are related to the healthcare industry and provide healthcare based decision support operations. For example, depending upon the particular implementation, the healthcare based operations may comprise patient diagnostics, medical treatment recommendation systems, medical practice management systems, personal patient care plan generation and monitoring, patient electronic medical record (EMR) evaluation for various purposes, such as for identifying patients that are suitable for a medical trial or a particular type of medical treatment, or the like. Thus, the decision support system 600 may be a healthcare decision support system 600 that operates in the medical or healthcare type domains and which may process requests for such healthcare operations via the request processing pipeline 608 input as either structured or unstructured requests, natural language input questions, or the like.

In one illustrative embodiment, the decision support system 600 is specifically configured to perform operations for performing medical study analytics using the multi-layer analytics framework 100 of FIG. 1. The particular analytics may take many different forms depending on the implementation and may perform any functions for analyzing medical images including, but not limited to, segmentation, anomaly detection, anatomical structure identification, anatomical structure measurements, and the like. The multi-layer analytics framework 100 operates in a manner as previously described above to wrap analytics from a variety of different sources and in a variety of different programming languages in a unified interface wrapper, register those analytics in the analytics/pipeline databases and indices 630 (which may be the various databases and data storages 160-190 in FIG. 1, for example), compose analytics pipelines based on these analytics, and execute those analytics pipelines in a distributed manner via various data processing systems or computing devices, e.g., servers 604B-D, and compile the results of such distributed execution into a response that may be returned to a requestor, e.g., a client computing device 610, via the decision support system 600. These operations may be performed in conjunction with, or as part of, the request processing pipeline 608 of the decision support system 600.

For example, in the medical imaging study analytics embodiment, a user of a client computing device 610 may send a request to the decision support system 600 to perform analysis of a medical imaging study for a particular patient, e.g., a request to identify cardiac anomalies in a CT medical imaging study of patient P. The decision support system 600 may retrieve the corresponding medical imaging study data from appropriate systems or sources of information in the corpus or corpora 606 and may invoke the multi-layer analytics framework 100 to generate, or retrieve, an analytics pipeline, execute the analytics pipeline to perform analytics on the medical imaging study to perform operations for processing the medical imaging study and provide the results back to the client computing device 610 via the decision support system 600. For example, salient images from the medical imaging study may be selected and output to the user via their computing device 610 to thereby assist the user in identifying which medical images in the medical imaging study are of most relevance to the user's request, provide annotated medical images that identify anatomical structures, identify regions of interest where anomalies may be present, provide anatomical measurement information, and the like. Any medical imaging study based analytics may be applied to generate corresponding results that may be provided to the user to assist with decision making regarding the treatment of patients.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 7 is provided as an example of one type of data processing system in which aspects of the present invention may be implemented. Many other types of data processing systems may be likewise configured to specifically implement the mechanisms of the illustrative embodiments.

FIG. 7 is a block diagram of an example data processing system in which aspects of the illustrative embodiments are implemented. Data processing system 700 is an example of a computer, such as server 604A or client 610 in FIG. 6, in which computer usable code or instructions implementing the processes for illustrative embodiments of the present invention are located. In one illustrative embodiment, FIG. 7 represents a server computing device, such as a server 604, which, which implements a cognitive system 600 and QA system pipeline 608 augmented to include the additional mechanisms of the illustrative embodiments described hereafter.

In the depicted example, data processing system 700 employs a hub architecture including North Bridge and Memory Controller Hub (NB/MCH) 702 and South Bridge and Input/Output (I/O) Controller Hub (SB/ICH) 704. Processing unit 706, main memory 708, and graphics processor 710 are connected to NB/MCH 702. Graphics processor 710 is connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 is connected to SB/ICH 704.

An operating system runs on processing unit 706. The operating system coordinates and provides control of various components within the data processing system 700 in FIG. 7. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System P® computer system, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and are loaded into main memory 708 for execution by processing unit 706. The processes for illustrative embodiments of the present invention are performed by processing unit 706 using computer usable program code, which is located in a memory such as, for example, main memory 708, ROM 724, or in one or more peripheral devices 726 and 730, for example.

A bus system, such as bus 738 or bus 740 as shown in FIG. 7, is comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, includes one or more devices used to transmit and receive data. A memory may be, for example, main memory 708, ROM 724, or a cache such as found in NB/MCH 702 in FIG. 7.

Those of ordinary skill in the art will appreciate that the hardware depicted in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

Figure 8:
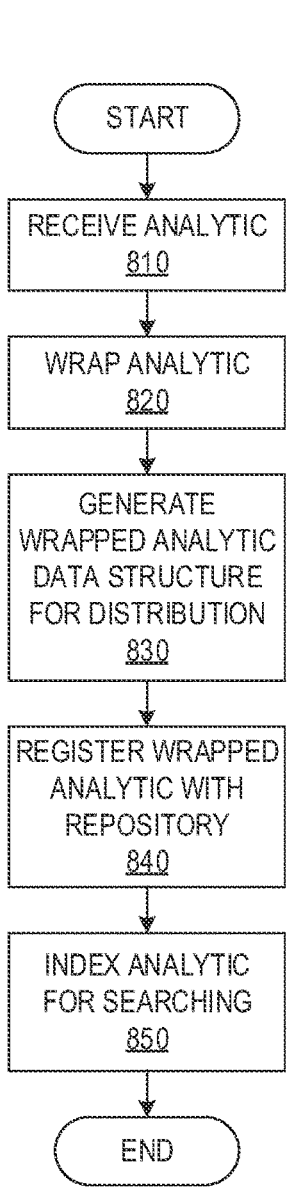
FIG. 8 is a flowchart outlining an example operation for obtaining and registering an analytic in accordance with one illustrative embodiment.

FIG. 8 is a flowchart outlining an example operation for obtaining and registering an analytic in accordance with one illustrative embodiment. As shown in FIG. 8, the operation starts by receiving an analytic from an analytic source computing system, such as via a particular programming language API corresponding to the programming language of the analytic (step 810). The analytic is wrapped in a unified interface wrapper to generate a wrapped analytic (step 820). The wrapped analytic is used to generate a wrapped analytics data structure, such as a JAR file or the like, that may be used for distribution of the wrapped analytic to various data processing systems or computing devices (step 830).

The wrapped analytic is then registered with an analytics database or repository (step 840) and is indexed to generate an analytic index data structure for search purposes (step 850). The registration may involve applying an analytics description framework (ADF) or analytics data model schema for defining analytics in the multi-layer analytics framework so as to extract information from the wrapped analytics data structure. Clinical knowledge resources may also be utilized to cross correlate the clinical knowledge with information present in the wrapped analytics data structure. Moreover, user input may also be obtained, such as via a user interface, to assist with defining the registration information needed to register an ADF instance corresponding to the wrapped analytic in the analytics registry and index. The operation then terminates.

It should be appreciated that this process may be followed for a plurality of different analytics in a variety of different programming languages, potentially from a variety of different source computing systems. As a result, the analytics registry may have a variety of analytics in different programming languages which are all wrapped with wrappers providing unified interfaces for exposing the interfaces of the particular programming language to a unified framework.

Figure 9:
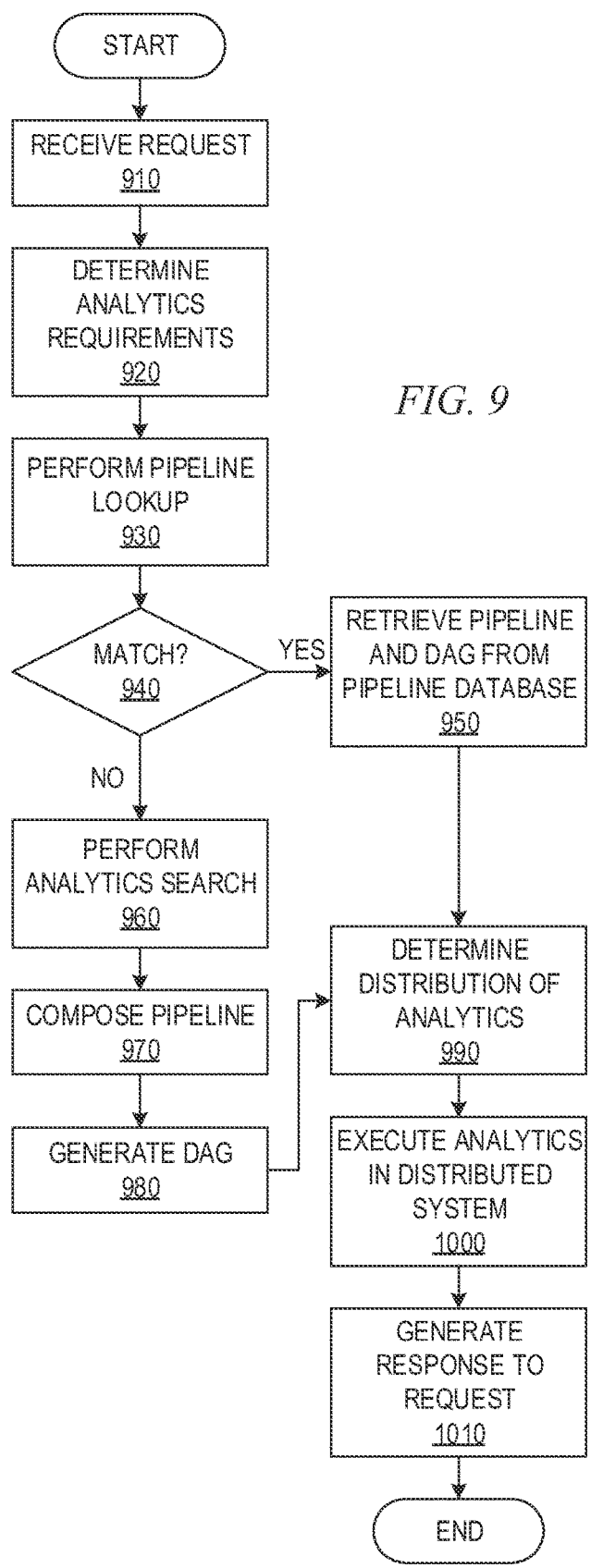
FIG. 9 is a flowchart outlining an example operation for executing an analytics pipeline in accordance with one illustrative embodiment.

FIG. 9 is a flowchart outlining an example operation for executing an analytics pipeline in accordance with one illustrative embodiment. As shown in FIG. 9, the operation starts by receiving a request to perform an analytics based operation on a specified input dataset, e.g., perform a particular analysis of a medical imaging study of a particular patient (step 910). The analytics composition layer of the multi-layer analytics framework determines the analytics requirements for performing the requested operation (step 920) and performs a lookup operation in a pipeline index (step 930) to determine if a previously defined pipeline has been registered that has characteristics matching the analytics requirements (step 940). If so, then the corresponding analytics pipeline is retrieved (step 950) and the operation proceeds to step 990. If there is no previously defined matching pipeline (step 940) then the analytics composition layer performs a search of the analytics in the registry (step 960) and composes an analytics pipeline combining a plurality of analytics that together perform the operation requested (step 970). A hierarchical model of the analytics pipeline, e.g., a DAG or other hierarchical model, is generated (step 980) and used to determine distribution of analytics to a plurality of data processing system or computing devices (step 990). The analytics are distributed for execution and the corresponding results are obtained and compiled into a response to the original request (step 1000). The response is then returned to the requestor computing device (step 1010) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a multi-layer analytics framework, the method comprising:
   receiving a request to perform an analytics operation on input data, the request specifying features of wrapped analytics to be used in generating an analytics pipeline;
   automatically composing the analytics pipeline at least by selecting wrapped analytics from a wrapped analytics registry based on the specified features, wherein composing the analytics pipeline comprises correlating wrapped analytics based on analytics data models associated with each of the selected wrapped analytics, wherein the analytics data models specify metadata about the corresponding wrapped analytic; and
   automatically executing the composed analytics pipeline on the input data to generate results data of the analytics operation.

2. The method of claim 1, further comprising applying, by the multi-layer analytics framework, a wrapper to each analytic in a plurality of analytics to thereby generate the wrapped analytics, and wherein wrappers associated with the at least two analytics are written in a same computer programming language as the analytic which is wrapped by the wrapper and implement a domain standardization model to provide the unified interface.

3. The method of claim 2, wherein the wrapper comprises a plurality of application programming interfaces (APIs) for various programming languages, and wherein the APIs provide a unified form to represent input parameters and configuration for analytics and a unified form to write analytics results and explanation.

4. The method of claim 1, wherein composing the analytics pipeline based on the specified features further comprises correlating inputs and outputs of the selected wrapped analytics such that a required input to a first selected wrapped analytic of the analytics pipeline is provided by at least one of the input dataset or an output of another second selected wrapped analytic.

5. The method of claim 1, wherein the analytics pipeline comprises a multi-modal analytics pipeline comprising wrapped analytics of different modalities, wherein a set of the wrapped analytics execute in parallel to other wrapped analytics of the analytics pipeline, and wherein results of the parallel execution of the set of wrapped analytics of the analytics pipeline are combined in append mode logic.

6. The method of claim 5, wherein the different modalities comprise at least two of textual analytics, imaging analytics, or reasoning analytics.

7. The method of claim 1, wherein the analytics data model corresponding to a wrapped analytic specifies at least one of metadata defining analytics pipelines with which the corresponding wrapped analytic is usable, knowledge addressed by the corresponding wrapped analytic, development and integration details of the corresponding wrapped analytic, environment setup details of the corresponding wrapped analytic, analytics delivery and execution models associated with the corresponding wrapped analytic, and performance details of the wrapped analytic.

8. The method of claim 1, wherein the analytics pipeline is executed in a distributed manner by a plurality of computing devices in accordance with a directed acyclic graph (DAG) representation of the analytics pipeline indicating which portions of the analytics pipeline are executed in parallel on different computing devices and which portions of the analytics pipeline are executed serially.

9. The method of claim 8, further comprising:
analyzing the DAG representation of the analytics pipeline to identify performance efficiency characteristics of the selected wrapped analytics and the analytics pipeline; and
distributing the selected wrapped analytics to a plurality of computing devices based on the identified performance efficiency characteristics.

10. The method of claim 1, further comprising:
applying, by the multi-layer analytics framework, a wrapper to each analytic in a plurality of analytics to thereby generate the wrapped analytics; and
registering the wrapped analytics in a wrapped analytics repository at least by, for each wrapped analytic, generating an index entry in an index data structure, the index entry specifying, for a corresponding wrapped analytic, inputs to the wrapped analytic, outputs of the wrapped analytic, and one or more performance characteristics of the wrapped analytic, in a searchable manner, and wherein automatically composing the analytics pipeline comprises searching index entries in the index data structure for wrapped analytics index entries having characteristics that match one or more of the specified features of wrapped analytics specified in the request.

11. The method of claim 1, wherein composing the analytics pipeline comprises:
searching a pipeline registry, having entries specifying characteristics of previously generated analytics pipelines, based on the specified features of wrapped analytics specified in the request, to determine if a matching entry in the pipeline registry having characteristics of a previously generated analytics pipeline that match the specified features is present;
in response to finding a matching entry in the pipeline registry, retrieving a corresponding analytics pipeline, and a corresponding directed acyclic graph data structure associated with the matching entry, as the composed analytics pipeline; and
in response to not finding a matching entry in the pipeline registry, performing the automatic composing of the analytics pipeline based on the specified features and based on inputs and outputs of the selected wrapped analytics.

12. A computer program product comprising a computer readable storage medium having a computer readable program stored therein, wherein the computer readable program, when executed on a computing device, causes the computing device to implement a multi-layer analytics framework, which operates to:
receive a request to perform an analytics operation on input data, the request specifying features of wrapped analytics to be used in generating an analytics pipeline;
automatically compose the analytics pipeline at least by selecting wrapped analytics from a wrapped analytics registry based on the specified features, wherein composing the analytics pipeline comprises correlating wrapped analytics based on analytics data models associated with each of the selected wrapped analytics, wherein the analytics data models specify metadata about the corresponding wrapped analytic; and
automatically execute the composed analytics pipeline on the input data to generate results data of the analytics operation.

13. The computer program product of claim 12, wherein the computer readable program further causes the computing device to apply, by the multi-layer analytics framework, a wrapper to each analytic in a plurality of analytics to thereby generate the wrapped analytics, and wherein wrappers associated with the at least two analytics are written in a same computer programming language as the analytic which is wrapped by the wrapper and implement a domain standardization model to provide the unified interface.

14. The computer program product of claim 13, wherein the wrapper comprises a plurality of application programming interfaces (APIs) for various programming languages, and wherein the APIs provide a unified form to represent input parameters and configuration for analytics and a unified form to write analytics results and explanation.

15. The computer program product of claim 12, wherein composing the analytics pipeline based on the specified features further comprises correlating inputs and outputs of the selected wrapped analytics such that a required input to a first selected wrapped analytic of the analytics pipeline is provided by at least one of the input dataset or an output of another second selected wrapped analytic.

16. The computer program product of claim 12, wherein the analytics pipeline comprises a multi-modal analytics pipeline comprising wrapped analytics of different modalities, wherein a set of the wrapped analytics execute in parallel to other wrapped analytics of the analytics pipeline, and wherein results of the parallel execution of the set of wrapped analytics of the analytics pipeline are combined in append mode logic.

17. The computer program product of claim 16, wherein the different modalities comprise at least two of textual analytics, imaging analytics, or reasoning analytics.

18. The computer program product of claim 12, wherein the analytics data model corresponding to a wrapped analytic specifies at least one of metadata defining analytics pipelines with which the corresponding wrapped analytic is usable, knowledge addressed by the corresponding wrapped analytic, development and integration details of the corresponding wrapped analytic, environment setup details of the corresponding wrapped analytic, analytics delivery and execution models associated with the corresponding wrapped analytic, and performance details of the wrapped analytic.

19. The computer program product of claim 12, wherein the analytics pipeline is executed in a distributed manner by a plurality of computing devices in accordance with a directed acyclic graph (DAG) representation of the analytics pipeline indicating which portions of the analytics pipeline are executed in parallel on different computing devices and which portions of the analytics pipeline are executed serially.

20. An apparatus comprising:
a processor; and
a memory coupled to the processor, wherein the memory comprises instructions which, when executed by the processor, cause the processor to implement a multi-layer analytics framework, which operates to:
receive a request to perform an analytics operation on input data, the request specifying features of wrapped analytics to be used in generating an analytics pipeline;
automatically compose the analytics pipeline at least by selecting wrapped analytics from a wrapped analytics registry based on the specified features, wherein composing the analytics pipeline comprises correlating wrapped analytics based on analytics data models associated with each of the selected wrapped analytics, wherein the analytics data models specify metadata about the corresponding wrapped analytic; and
automatically execute the composed analytics pipeline on the input data to generate results data of the analytics operation.

\* \* \* \* \*